(12) United States Patent
Parkman et al.

(10) Patent No.: US 11,280,208 B2
(45) Date of Patent: Mar. 22, 2022

(54) LABYRINTH SEAL ASSEMBLY

(71) Applicant: PRATT & WHITNEY CANADA CORP., Longueuil (CA)

(72) Inventors: Kenneth Parkman, Halton Hills (CA); Maksim Pankratov, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 162 days.

(21) Appl. No.: 16/553,776

(22) Filed: Aug. 28, 2019

(65) Prior Publication Data

US 2021/0047937 A1 Feb. 18, 2021

Related U.S. Application Data

(60) Provisional application No. 62/886,533, filed on Aug. 14, 2019.

(51) Int. Cl.
| | | |
|---|---|---|
| F01D 11/02 | (2006.01) | |
| F02C 7/28 | (2006.01) | |
| F01D 25/16 | (2006.01) | |
| F16J 15/447 | (2006.01) | |
| F16C 19/52 | (2006.01) | |

(52) U.S. Cl.
CPC ............... *F01D 11/02* (2013.01); *F02C 7/28* (2013.01); *F01D 25/16* (2013.01); *F05D 2220/32* (2013.01); *F05D 2240/55* (2013.01); *F16C 19/525* (2013.01); *F16J 15/447* (2013.01)

(58) Field of Classification Search
CPC ........ F16J 15/00; F16J 15/447; F16J 15/4472; F16J 15/4474; F16J 15/4476; F16J 15/4478; F01D 11/00; F01D 11/02; F01D 11/08; F01D 11/025; F01D 25/00; F01D 25/16; F01D 25/162; F02C 7/00; F02C 7/28; F05D 2220/00; F05D 2220/32; F05D 2220/321; F05D 2220/3212; F05D 2220/3213; F05D 2220/3215; F05D 2220/3216–2220/3219; F05D 2240/00; F05D 2240/55; F16C 19/52; F16C 19/525
USPC ......................................................... 277/412
See application file for complete search history.

(56) References Cited

U.S. PATENT DOCUMENTS

| | | |
|---|---|---|
| 3,514,112 A | 5/1970 | Prenger et al. |
| 4,099,727 A | 7/1978 | Weiler |
| 5,052,828 A | 10/1991 | Ciokajlo et al. |
| 5,284,347 A | 2/1994 | Pope |
| 5,333,993 A | 8/1994 | Stueber et al. |
| 5,636,848 A | 6/1997 | Hager et al. |
| 6,142,729 A | 11/2000 | Tran et al. |

(Continued)

FOREIGN PATENT DOCUMENTS

EP  3081768 B1  6/2019

*Primary Examiner* — Nathan Cumar
(74) *Attorney, Agent, or Firm* — Norton Rose Fulbright Canada LLP

(57) ABSTRACT

A labyrinth seal assembly for a gas turbine engine having a rotatable shaft. The labyrinth seal assembly has: a housing defining a cavity for receiving a lubricant; a labyrinth seal between the housing and the rotatable shaft of the gas turbine engine, the labyrinth seal having a seal rotor securable to the rotatable shaft and a seal stator secured to the housing; and an insulation layer between the seal stator and the housing, the insulation layer composed of a material different than those used for the seal stator and the housing.

20 Claims, 2 Drawing Sheets

(56) References Cited

U.S. PATENT DOCUMENTS

| | | |
|---|---|---|
| 6,471,216 B1 | 10/2002 | Brainch et al. |
| 6,629,816 B2 | 10/2003 | Langston et al. |
| 7,001,075 B2 | 2/2006 | Bradshaw |
| 7,055,827 B2 | 6/2006 | Langston et al. |
| 7,717,671 B2 | 5/2010 | Addis |
| 8,444,153 B2 | 5/2013 | Gaebler et al. |
| 8,485,531 B2 | 7/2013 | Durling |
| 8,523,512 B2 | 9/2013 | Flanagan |
| 8,827,637 B2 | 9/2014 | Ivakitch et al. |
| 8,840,114 B2 | 9/2014 | Dixon et al. |
| 8,920,136 B2 | 12/2014 | Legros et al. |
| 9,022,390 B2 | 5/2015 | Amador |
| 9,115,592 B2 | 8/2015 | Gauthier et al. |
| 9,410,556 B2 | 8/2016 | Miller et al. |
| 9,745,857 B2 | 8/2017 | Carrieres |
| 9,790,863 B2 | 10/2017 | O'Brien |
| 9,840,938 B1 | 12/2017 | Vinski |
| 9,926,797 B2 | 3/2018 | Porter et al. |
| 9,944,399 B2 | 4/2018 | Desjardins |
| 9,957,826 B2 | 5/2018 | Novikov et al. |
| 9,989,083 B2 | 6/2018 | Labbe |
| 10,012,101 B2 | 7/2018 | Simon-Delgado et al. |
| 10,012,315 B2 | 7/2018 | Barger et al. |
| 10,100,672 B2 | 10/2018 | Vdoviak, Jr. et al. |
| 10,161,256 B2 | 12/2018 | Porter et al. |
| 10,196,986 B2 * | 2/2019 | Fang .................. F16J 15/406 |
| 10,208,610 B2 | 2/2019 | Miller |
| 10,215,098 B2 | 2/2019 | Cherolis et al. |
| 10,221,761 B2 | 3/2019 | Sandoval |
| 10,260,636 B2 | 4/2019 | Kostka et al. |
| 10,280,932 B2 | 5/2019 | Mei et al. |
| 10,287,981 B2 * | 5/2019 | Duffy .................. F01D 25/183 |
| 10,309,246 B2 | 6/2019 | Miranda |
| 10,329,938 B2 | 6/2019 | Prenger et al. |
| 2002/0041070 A1 | 4/2002 | Tran et al. |
| 2013/0078091 A1 * | 3/2013 | Rees .................. F16J 15/4472 |
| | | 415/230 |
| 2014/0300058 A1 * | 10/2014 | Brunet .................. F01D 11/02 |
| | | 277/351 |
| 2014/0301848 A1 * | 10/2014 | Valero Lafuente ..... F03D 80/70 |
| | | 416/174 |
| 2016/0032765 A1 | 2/2016 | Shuaib et al. |
| 2016/0032840 A1 | 2/2016 | James |
| 2017/0051834 A1 | 2/2017 | Webster et al. |
| 2017/0067397 A1 * | 3/2017 | Fang .................. F16C 33/664 |
| 2017/0152754 A1 * | 6/2017 | Leutard .................. F01D 25/186 |
| 2018/0003069 A1 | 1/2018 | Bidkar et al. |
| 2018/0283210 A1 | 10/2018 | Cigal et al. |
| 2018/0340439 A1 * | 11/2018 | Vinski .................. F01D 25/183 |
| 2018/0371929 A1 * | 12/2018 | Amador .................. F16C 33/76 |
| 2019/0203607 A1 | 7/2019 | Dudley et al. |

\* cited by examiner

LABYRINTH SEAL ASSEMBLY

CROSS-REFERENCE TO RELATED APPLICATIONS

This application claims priority of U.S. provisional patent application No. 62/886,533 filed on Aug. 14, 2019, the entire content of which is incorporated herein by reference.

TECHNICAL FIELD

The application relates generally to gas turbine engines and, more particularly, to seals used in such engines.

BACKGROUND OF THE ART

It is often desirable to create seal assemblies for isolating various parts or spaces from one another. As one example, in a gas turbine engine having a rotatable shaft supported by a shaft bearing, it is desirable to provide lubricant to the shaft bearing without allowing the lubricant to leak to surrounding components. An isolated chamber is formed around the shaft bearing by casing members for the purpose of retaining lubricant, and a seal assembly is used to seal between the static casing members and the rotatable shaft.

Labyrinth-type seal assemblies are often used to seal between the static casing and rotatable shaft. However, the lubricant within the isolated chamber is sometimes at a different temperature than the temperature of the surrounding environment. This may give raise to thermal gradients in the different sealing parts and ultimately result in lubricant leakage. Improvements are therefore desired.

SUMMARY

In one aspect, there is provided a labyrinth seal assembly for a gas turbine engine having a rotatable shaft, the labyrinth seal assembly comprising: a housing defining a cavity for receiving a lubricant; a labyrinth seal between the housing and the rotatable shaft of the gas turbine engine, the labyrinth seal having a seal rotor securable to the rotatable shaft and a seal stator secured to the housing; and an insulation layer between the seal stator and the housing, the insulation layer composed of a material different than those used for the seal stator and the housing.

In another aspect, there is provided a gas turbine engine comprising: a shaft; an engine casing circumferentially extending around the shaft and defining a housing having a cavity therein; a labyrinth seal between the housing and the shaft and between the cavity and an environment outside the cavity, the labyrinth seal having a seal rotor secured to the shaft and a seal stator secured to the housing, the seal rotor rotatable relative to the seal stator, the seal stator in a sealing engagement with the seal rotor; and an insulation layer between the seal stator and the housing, the insulation layer composed of a material different than those used for the seal stator and the housing.

In yet another aspect, there is provided a method of operating a labyrinth seal assembly, comprising: receiving lubricant within a cavity; limiting the lubricant from leaking out of the cavity with a labyrinth seal; and thermally insulating a seal stator of the labyrinth seal from the lubricant within the cavity.

DESCRIPTION OF THE DRAWINGS

Reference is now made to the accompanying figures in which.

DETAILED DESCRIPTION

Figure 1:
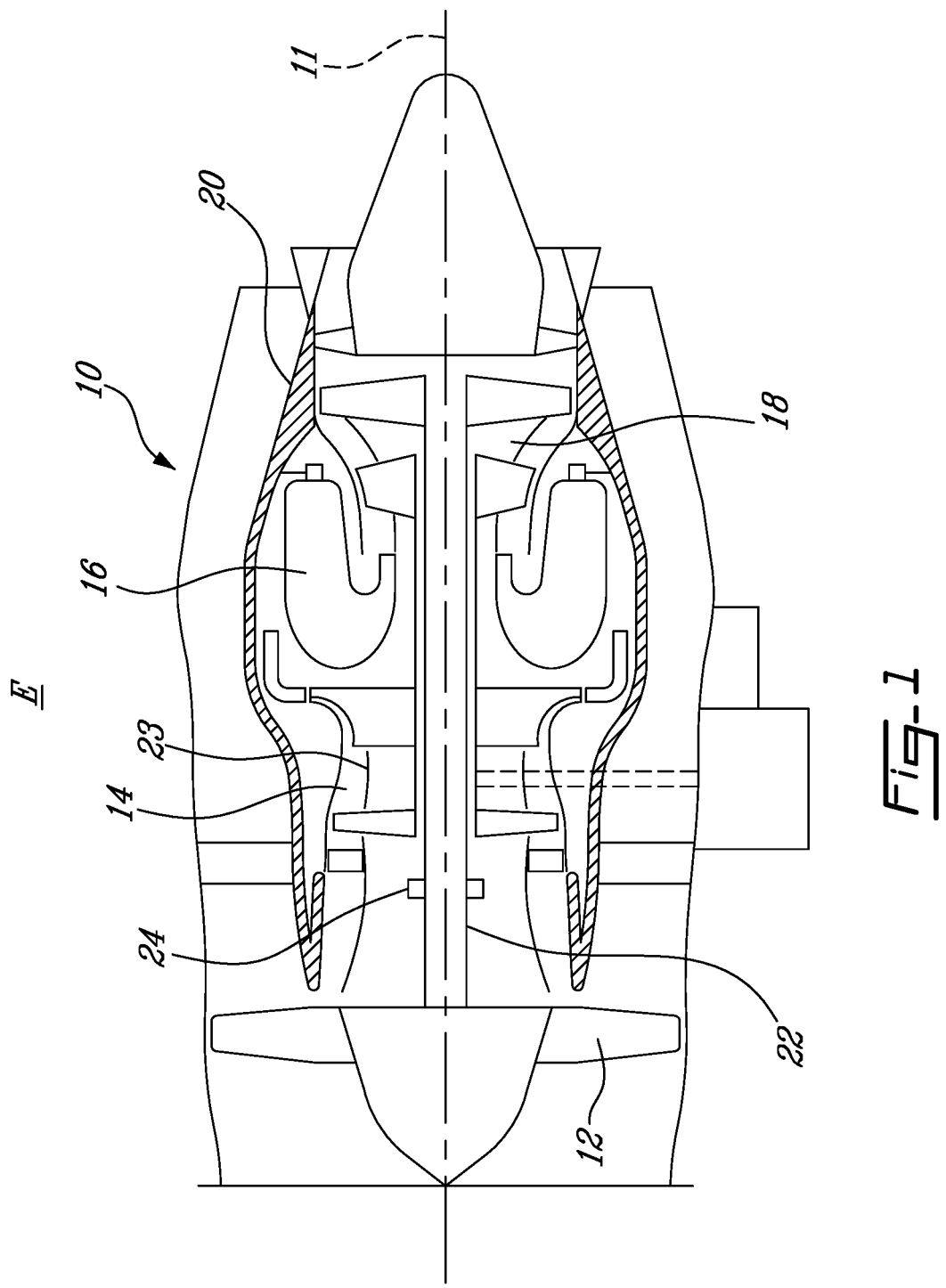
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Still referring to FIG. 1, the gas turbine engine 10 has an engine casing 20 that circumferentially extends around the central axis 11 and surrounds the compressor section 14, the combustor 16, and the turbine section 18. The gas turbine engine 10 includes a shaft 22, which is a low-pressure shaft in the embodiment shown, that is coaxial with the central axis 11. It is understood that the disclosure below may be applicable to a high-pressure shaft 23 that is co-axial with the low-pressure shaft 22. For rotatably supporting the shaft, bearings 24 (only one illustrated in FIG. 1) may be located along the shaft 22 and may be disposed radially between the engine casing 20 and the shaft 22. A lubricant distribution system (not shown) is provided to supply lubricant to the bearing 24.

Figure 2:
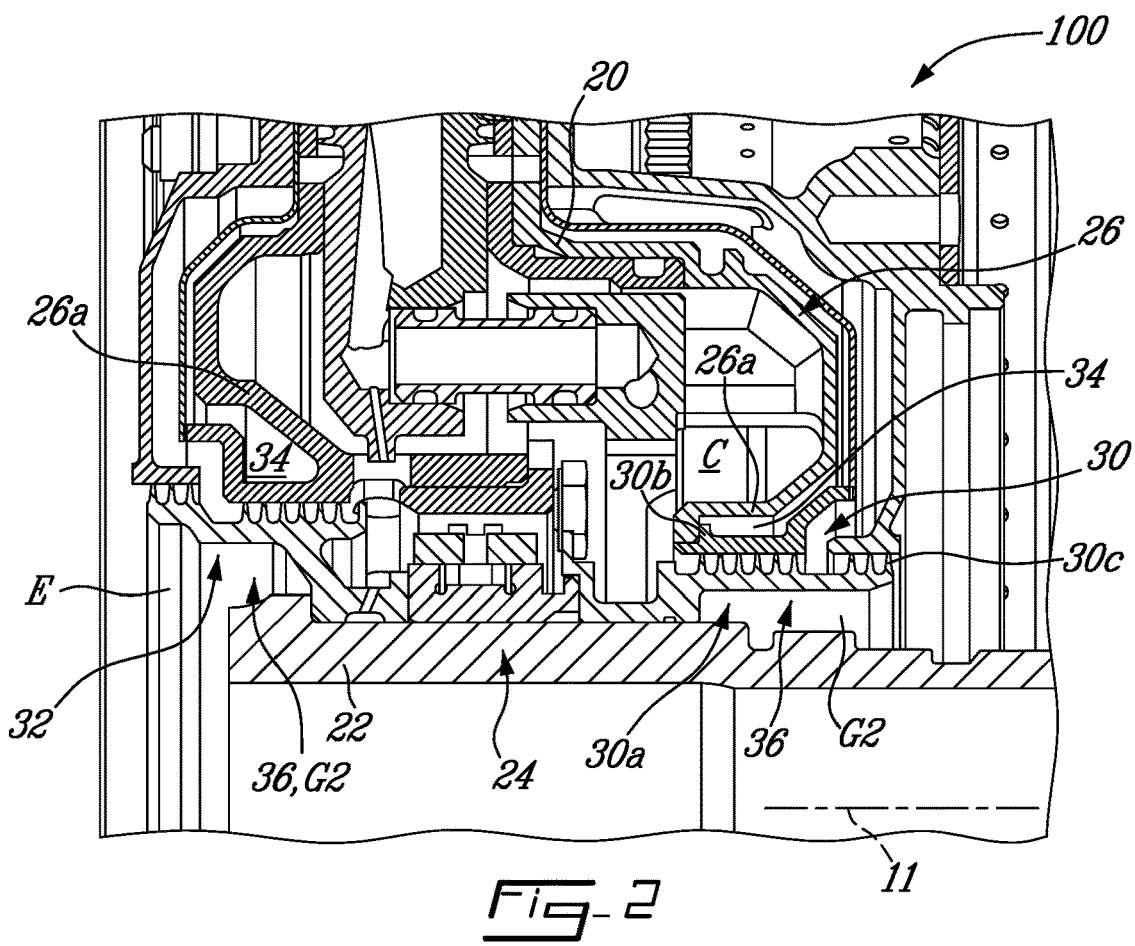
FIG. 2 is a schematic cross sectional view of a seal assembly that can be used with the gas turbine engine of FIG. 1.

Referring now to FIG. 2, in order to limit lubricant from leaking to environment E surrounding the bearing 24, higher air pressure, and a labyrinth seal assembly 100 is provided. The labyrinth seal assembly might minimize air leakage into oil system. The assembly 100 includes a housing 26. The housing 26 may circumferentially extend all around the central axis 11 of the gas turbine engine 10. The housing 26 may be a separate component that is secured to the engine casing 20 at its radially-outer end and may extend radially between the shaft 22 and the engine casing 20 relative to the central axis 11. Alternatively, the housing 26 may be defined by the engine casing 20.

As shown in FIG. 2, the housing 26 defines a chamber or cavity C therein. The cavity C is fluidly connected to the source of lubricant for receiving lubricant therein. As shown in FIG. 2, the bearing 24 is located inside the cavity C defined by the housing 26. Therefore, the bearing 24 may be continually fed with lubricant from the source of lubricant. The housing 26 is used for containing the lubricant therein. However, lubricant might leak at an interface between the housing 26 and the shaft 22. To limit such lubricant leakages, one or more seals are provided and are disposed radially between the housing 26, and the shaft 22 relative to the central axis 11.

Figure 3:
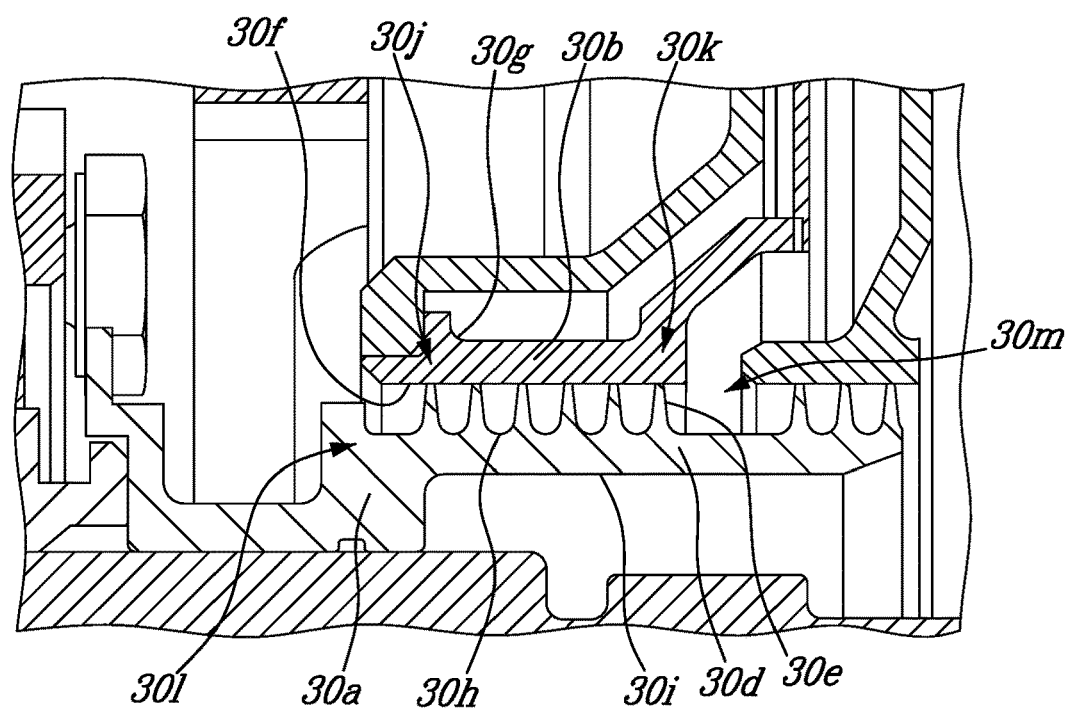
FIG. 3 is an enlarged view of a portion of FIG. 2.

Referring concurrently to FIGS. 2 and 3, it can be appreciated that the labyrinth seal assembly 100 includes two seals, namely a first labyrinth seal 30 and a second labyrinth seal 32, each located on a respective one of opposite sides of the bearing 24. The bearing 24 is located axially between the first and second seals 30, 32 relative to the central axis 11. The first seal 30 will be described in more details herein below. It is understood that the same description may be applied to the second seal 32. Consequently, the below description will use a singular form.

The seal 30 includes a seal rotor 30a and a seal stator 30b. The seal rotor 30a is secured to the shaft 22 for joint rotation therewith relative to the central axis 11. The seal stator 30b is secured to the housing 26, which is, in turn, secured to the engine casing 20. The seal stator 30b defines a sealing engagement with the seal rotor 30a. In the depicted embodiment, the seal 30 is referred to as a labyrinth seal as it includes a plurality of axially distributed fins 30c (FIG. 2). In the depicted embodiment, the fins 30c are secured to the seal rotor 30a. Each of the fins 30c has a root 30d (FIG. 3) that is secured to the rotor 30a and a distal tip 30e (FIG. 3) that is radially spaced apart from the root 30d. The tips 30e of the fins 30c are radially spaced apart from the seal stator 30d. A cooperation of the fins 30c with the seal stator 30b is intended to limit lubricant contained within the cavity C from leaking outside of the cavity C toward the environment E and to limit air leakage into the cavity C. This might improve sealing efficiency and oil system function.

Referring more particularly to FIG. 3, the seal stator 30b has a sealing face 30f and an opposed back face 30g. The sealing face 30f of the seal stator 30b is oriented toward the seal rotor 30a. Similarly, the seal rotor 30a has a sealing face 30h that includes the fins 30c and an opposed back face 30i. The sealing face 30h of the seal rotor 30a is oriented toward the seal stator 30b and the opposed face 30i of the seal rotor 30a is oriented toward the central axis 11 of the gas turbine engine 10. As shown in FIG. 3, the seal stator 30b has a cavity end, also referred to as an inboard side, 30j and an opposed environment end, also referred to as an outboard side, 30k. Similarly, the seal rotor 30a has a cavity end, also referred to as an inboard side, 30l and an opposed environment end, also referred to as an outboard side, 30m. In the embodiment shown, the environment ends 30k, 30m of both the seal stator and rotor 30b, 30a are cantilevered and outside the cavity C.

In a typical configuration that is not illustrated herein, the opposed face 30g of the seal stator 30b, is exposed to the cavity C. In other words, the lubricant that is circulating within the cavity C might contact and/or impinge the seal stator 30b. This might decrease a temperature of the seal stator 30b. In other words, the temperature of the seal stator 30b might be less than that of the seal rotor 30a because of the oil that contacts the opposite face 30g of the seal stator 30b. This might cause the cavity end of the stator to be at a lower temperature than the environment end thereby creating a thermal expansion mismatch between the cavity and environment end of the seal stator. In turn, this might require an increase of a distance between the sealing faces of the seal stator and seal rotor and impair sealing efficiency of the labyrinth seal. In a typical configuration, the stator is cooled by bearing compartment oil. This may under certain circumstances negatively affect seal function as the thermal gradients become opposite to those on the rotating component, forcing larger required seal operating clearances due to poor control of the mismatched thermal growths. The typical configuration would have the stator portion at environment end 30k exposed to oil on one side and therefore cooler than the seal rotor, forcing uneven operating clearance at both ends, and undesirable increased overall clearance at some operating conditions.

In the embodiment shown in FIG. 2, an insulation layer 34 is provided between the seal stator 30b and the housing 26. The insulation layer 34 may be located outside of the cavity C. The insulation layer 34 is used to limit direct contact between the lubricant (e.g. oil) in the cavity C and the seal stator 30b.

In the depicted embodiment, the insulation layer 34 is an air gap G that extends from the seal stator 30b to the housing 26. More specifically, the housing 26 defines connecting portion 26a that is used to connect the seal stator 30b to a remainder of the housing 26. The connecting portion 26a extends at least radially between the engine casing 20 and the seal stator 30b.

In the embodiment shown, the connecting portion 26a extends radially and axially relative to the central axis 11. In other words, the connecting portion 26a of the housing 26 axially overlaps the seal stator 30b. As shown in FIG. 2, the connecting portion 26a of the housing 26 overlaps the seal stator 30b from the cavity end 30j of the seal stator 30b to the environment end 30k of the seal stator 30b.

In the depicted embodiment, the connecting portion 26a of the housing 26 is secured to the seal stator 30b at the cavity end 30j of the seal stator 30b. In so doing, the opposed face 30g of the seal stator 30b, is not located within the cavity C of the housing 26. The insulation layer 34 is located between the connecting portion 26a of the housing 26 and the seal stator 30b.

Consequently, the seal stator 30b may be shielded by the insulation layer 36 (e.g., air gap G) and by the housing connecting portion 26a against any contact or thermal impact that would have been generated by the lubricant contained within the lubricating cavity C.

The connecting portion 26a of the housing 26 may extend parallel to the seal stator 30b opposite face 30g (as shown in FIG. 3). Alternatively, the connecting portion 26a of the housing 26 may extend at an angle relative to the opposite face 30g of the seal stator 30b (as shown with the labyrinth seal 32 on the left-hand side of FIG. 2). In this latter case, the connecting portion 26a extends radially and axially relative to the central axis 11 and converges to meet the cavity end of the seal stator.

In a particular embodiment, a length of the insulation layer 34, which is herein taken along the axis 11 of the engine 10, and/or a length of the rotor opposed face 30i can be adjusted to tune the thermal properties to match or control relative deflections of the seal rotor/stator and sealing efficiency.

Still referring to FIGS. 2 and 3, the seal rotor 30a may be a separate component secured to the shaft 22 of the gas turbine engine 10. As illustrated, the opposed face 30i of the seal rotor 30a is radially spaced apart from the shaft 22. Therefore, a second insulation layer 36 is disposed between the shaft 22 and the seal rotor 30a. The second insulation layer 36 may be an air gap G that is disposed radially between the shaft 22 and at least a portion of the opposed face 30i of the seal rotor 30a.

Consequently, and in the depicted embodiment, the seal stator 30b and the seal rotor 30a are located within the environment E and might be subjected to the same temperature field. Hence, both of the seal stator and rotor 30b, 30a might have a similar temperature distribution and might exhibit similar thermal expansions relative to one another.

Referring to all figures, for operating the labyrinth seal assembly 100, lubricant is received within the cavity C. The lubricant is limited from leaking out of the cavity C with one or more labyrinth seals 30 and the seal stator 30b of the labyrinth seal 30 is thermally insulated from the lubricant that flows within the cavity C. In the depicted embodiment, the seal stator 30b is thermally insulated from the lubricant in the cavity C by the air gap G that is defined between the seal stator 30b and the housing 26, more specifically, the connecting portion 26a of the housing 26.

Herein, the static stator portion of the seal is mounted intentionally such that it might be insulated from the bearing compartment oil thermal effects. This might allow the stator to be designed with a similar operating thermal pattern to the rotating portion of the seal, and then thermal growth and coning of both static and rotating components might be matched to optimize and reduce seal clearances throughout the complete operating range. This might result in reduced air flow and thermal load on the air-oil system of the engine. This might have the further benefit of allowing more complete static air insulation for the bearing compartment (e.g., cavity C) for reduced heat input to the oil system.

In a particular embodiment, the disclosed assembly 10 allows matching of thermal gradient, so the seal rotating and static component coning matches and allows reduced operating clearance and better air/oil system performance. In a particular embodiment, the high heat transfer seal air is no longer adjacent to a compartment wall (e.g., housing connecting portions 26a), and therefore overlap compartment operating temperature and heat load of the oil system is reduced. The seal stator may be separated from cooled wall of the housing 26 by being supported at its inboard side (cavity side).

In operation, environment end 30k has a higher temperature than cavity end 30j, and therefore has different thermal expansion. Herein, thermal growth at both ends might be matched as both the seal rotor and seal stator are subject to similar thermal operating conditions.

For operating the labyrinth seal, the lubricant is received within the cavity; the lubricant is limited from leaking out of the cavity with the labyrinth seal; and the seal stator is thermally insulated from the lubricant within the cavity. Herein, thermally insulating the seal stator includes thermally insulating the seal stator with an air gap located between the seal stator and the housing.

Embodiments disclosed herein include:

A. A labyrinth seal assembly for a gas turbine engine having a rotatable shaft, the labyrinth seal assembly comprising: a housing defining a cavity for receiving a lubricant; a labyrinth seal between the housing and the rotatable shaft of the gas turbine engine, the labyrinth seal having a seal rotor securable to the rotatable shaft and a seal stator secured to the housing; and an insulation layer between the seal stator and the housing, the insulation layer composed of a material different than those used for the seal stator and the housing.

B. A gas turbine engine comprising: a shaft; an engine casing circumferentially extending around the shaft and defining a housing having a cavity therein; a labyrinth seal between the housing and the shaft and between the cavity and an environment outside the cavity, the labyrinth seal having a seal rotor secured to the shaft and a seal stator secured to the housing, the seal rotor rotatable relative to the seal stator, the seal stator in a sealing engagement with the seal rotor; and an insulation layer between the seal stator and the housing, the insulation layer composed of a material different than those used for the seal stator and the housing.

Embodiments A and B may include any of the following elements, in any combinations:

Element 1: the material is air and the insulation layer includes an air gap extending from the seal stator to the housing outside the cavity. Element 2: the seal stator is connected to the housing at an inboard side of the seal stator. Element 3: the seal rotor is spaced apart from the shaft by an air gap located outside the cavity. Element 4: a second labyrinth seal, the cavity located between the labyrinth seal and the second labyrinth seal, the second labyrinth seal having a second seal stator in sealing engagement with a second seal rotor, the second seal stator secured to the housing, a second insulation layer between the second seal stator and the housing. Element 5: the second seal stator is secured to the housing at an inboard side of the second seal stator. Element 6: a connecting portion of the housing overlaps the seal stator, the insulation layer located between the connecting portion of the housing and the seal stator. Element 7: the connecting portion of the housing is substantially parallel to a face of the seal stator opposite a sealing face of the seal stator. Element 8: the connecting portion of the housing is angled relative to the seal stator. Element 9: the connecting portion of the housing overlaps the seal stator from an outboard side of the seal stator to an inboard side of the seal stator.

The above description is meant to be exemplary only, and one skilled in the art will recognize that changes may be made to the embodiments described without departing from the scope of the invention disclosed. For example, the insulation layer may comprise any suitable insulation material, and include at least one material (whether in gas, liquid or solid state) that is different than the adjacent materials between which insulation is desired. The above described configuration may be used for different thermal configurations, that is, the seal stator may be mounted to have it correspond to whichever condition the labyrinth seal is exposed to (hot or cold). Still other modifications which fall within the scope of the present invention will be apparent to those skilled in the art, in light of a review of this disclosure, and such modifications are intended to fall within the appended claims.

The invention claimed is:

1. A labyrinth seal assembly for a gas turbine engine having a rotatable shaft, the labyrinth seal assembly comprising: a housing defining a cavity for receiving a lubricant; a labyrinth seal between the housing and the rotatable shaft of the gas turbine engine, the labyrinth seal having a seal rotor securable to the rotatable shaft and a seal stator secured to the housing, the seal stator having a sealing face facing the seal rotor and a face opposed to the sealing face, and a portion of the housing overlaps the face; and an insulation layer between the seal stator and the housing, the insulation layer composed of a material different than those used for the seal stator and the housing, the insulation layer located outside the cavity defined by the housing and extending from the face of the seal stator and away from the sealing face and lies between the portion of the housing and face.

2. The labyrinth seal assembly of claim 1, wherein the material is air and the insulation layer includes an air gap extending from the seal stator to the housing outside the cavity.

3. The labyrinth seal assembly of claim 1, wherein the seal stator is connected to the housing at an inboard side of the seal stator.

4. The labyrinth seal assembly of claim 1, wherein the seal rotor is spaced apart from the shaft by an air gap located outside the cavity.

5. The labyrinth seal assembly of claim 1, further comprising a second labyrinth seal, the cavity located between the labyrinth seal and the second labyrinth seal, the second labyrinth seal having a second seal stator in sealing engagement with a second seal rotor, the second seal stator secured to the housing, a second insulation layer between the second seal stator and the housing.

6. The labyrinth seal assembly of claim 5, wherein the second seal stator is secured to the housing at an inboard side of the second seal stator.

7. The labyrinth seal assembly of claim 1, wherein a connecting portion of the housing overlaps the seal stator, the insulation layer located between the connecting portion of the housing and the seal stator.

8. The labyrinth seal assembly of claim 7, wherein the connecting portion of the housing is substantially parallel to the face of the seal stator opposite the sealing face of the seal stator.

9. The labyrinth seal assembly of claim 7, wherein the connecting portion of the housing is angled relative to the seal stator.

10. The labyrinth seal assembly of claim 7, wherein the connecting portion of the housing overlaps the seal stator from an outboard side of the seal stator to an inboard side of the seal stator.

11. A gas turbine engine comprising: a shaft; an engine casing circumferentially extending around the shaft and defining a housing having a cavity therein; a labyrinth seal between the housing and the shaft and between the cavity and an environment outside the cavity, the labyrinth seal having a seal rotor secured to the shaft and a seal stator secured to the housing, the seal stator having a sealing face facing the seal rotor and a face opposed to the sealing face, and a portion of the housing overlaps the face, the seal rotor rotatable relative to the seal stator, the seal stator in a sealing engagement with the seal rotor; and an insulation layer between the seal stator and the housing, the insulation layer composed of a material different than those used for the seal stator and the housing, the insulation layer separated from the cavity by the housing and lies between the portion of the housing and face, the face of the seal stator located outside the cavity.

12. The gas turbine engine of claim 11, wherein the insulation layer is an air gap extending from the seal stator to the housing.

13. The gas turbine engine of claim 11, wherein the seal stator is connected to the housing at an inboard side of the seal stator.

14. The gas turbine engine of claim 11, wherein the seal rotor is spaced apart from the shaft by an air gap located outside the cavity.

15. The gas turbine engine of claim 11, further comprising a second labyrinth seal, the cavity located between the labyrinth seal and the second labyrinth seal, the second labyrinth seal having a second seal stator in sealing engagement with a second seal rotor, the second seal stator secured to the housing, a second insulation layer between the second seal stator and the housing.

16. The labyrinth seal of claim 11, wherein a connecting portion of the housing overlaps the seal stator, the insulation layer located between the connecting portion of the housing and the seal stator.

17. The labyrinth seal of claim 16, wherein the connecting portion of the housing is substantially parallel to the face of the seal stator opposite the sealing face of the seal stator.

18. The labyrinth seal of claim 17, wherein the connecting portion of the housing overlaps the seal stator from an outboard side of the seal stator to an inboard side of the seal stator.

19. A method of operating a labyrinth seal assembly, comprising: receiving lubricant within a cavity; limiting the lubricant from leaking out of the cavity with a labyrinth seal; and thermally insulating a seal stator of the labyrinth seal from the lubricant within the cavity with an insulation layer located outside the cavity, the insulation layer in contact with a face of the seal stator opposed a sealing face of the seal stator that faces a seal rotor, and lies between a portion of the housing that overlaps the face and the face.

20. The method of claim 19, wherein thermally insulating the seal stator includes thermally insulating the seal stator with the insulation layer being an air gap located between the seal stator and the housing.

\* \* \* \* \*